G. J. DEHN.
PIPE CONNECTION.
APPLICATION FILED JUNE 5, 1911.

1,120,697.

Patented Dec. 15, 1914.

Witnesses:
Frank W. Bemm
Amy Jehle

Inventor:
George J. Dehn
By: Fred Gerlach
Atty

UNITED STATES PATENT OFFICE.

GEORGE J. DEHN, OF CHICAGO, ILLINOIS.

PIPE CONNECTION.

1,120,697.  Specification of Letters Patent.  Patented Dec. 15, 1914.

Application filed June 5, 1911. Serial No. 631,379.

*To all whom it may concern:*

Be it known that I, GEORGE J. DEHN, a resident of Chicago, in the county of Cook and State of Illinois, have invented certain new and useful Improvements in Pipe Connections, of which the following is a full, clear, and exact description.

The invention relates to pipe-connections. In making pipe-connections to closets it is frequently desirable to employ an adjustable fitting or connection which permits the closet to be set in the desired position relatively to the pipe, after the latter has been installed.

The invention designs to provide an improved connection which is adjustable and may be made water tight by packing or filling between the members to be connected, and in which provision is made for retaining one member or the collar in the desired relation to the fixed pipe while the connection is being made. By this means, the necessity of one laborer holding the members in assigned position is avoided and the members will be connected in the accurate relation desired.

A still further object of the invention is to provide means for temporarily closing the pipe until the pipes have been tested and to prevent material from dropping into it or to prevent the water from passing through until the closet has been connected to the pipe as a substitute for a rubber-plug now in common use for that purpose and which is sometimes removed before it should be.

The invention further designs to provide an improved connection which is properly adapted for closet bends which is simple in construction and which facilitates making the connection in different positions.

Figure 1:
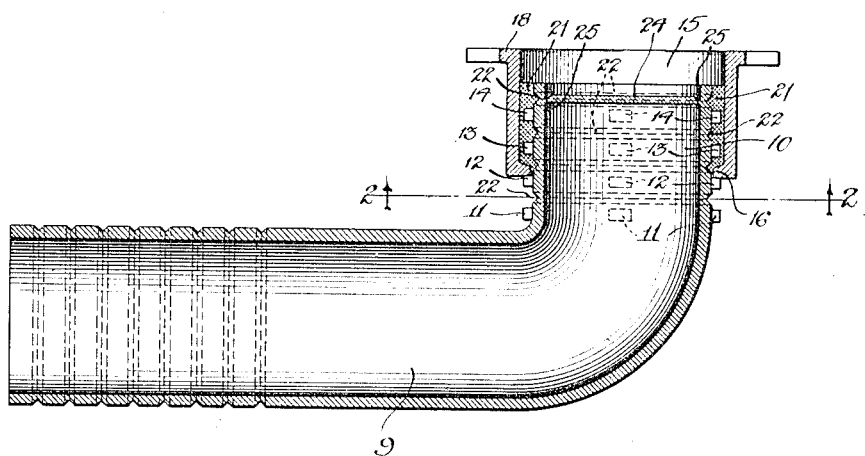
Figure 2:
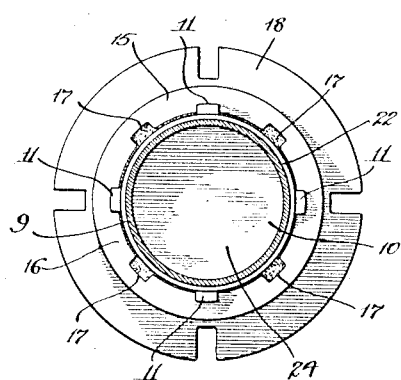

In the drawings, Figure 1 is a section of a closet bend and connection therefor embodying the invention. Fig. 2 is a section taken on line 2—2 of Fig. 1.

9 denotes a soil pipe provided with an upward bend 10, to be connected to a closet. The outer side of the terminal 10 is provided with annular series of lugs 11, 12, 13 and 14, which project from the outer side of the pipe, leaving spaces between them, and each annular series is adapted to support a collar 15 which is provided with an inturned flange 16, at its bottom, and has a series of notches 17 therein, corresponding to the lugs on the outer side of pipe-terminal 10. The collar thus formed, may be slipped downwardly over the lugs on the pipe-terminal when the notches 17 are in registry with said lugs and when the collar is turned relatively to the pipe the flange 16 will rest upon one series of said lugs, which are disposed at different elevations so that the collar may be correspondingly held at different elevations, according to the series of lugs upon which the collar is supported. The space between the inner side of collar 15 and the outer side of pipe terminal 10 is filled with Babbitt-metal or suitable filling which is adapted to flow, or to be packed, into said space, to form a water-tight closure between the collar and the pipe-terminal. The collar 15 is also provided with a top flange 18 which is adapted to be secured to the closet, or other fitting, in suitable manner, well understood in the art.

In practice, it frequently occurs that the elevation of the soil-pipe 9 is not placed at the desired level for connecting with the closet. Manifestly, by placing the collar in position upon either of the different series of lugs on the pipe-terminal, it will be held at different elevations, and the collar may be readily slipped downwardly on the pipe and turned into position, as shown in Fig. 2, to be supported by the desired series of lugs, so that the collar will be placed at the desired elevation for connection with the closet. When the collar has been placed on the lugs, it will be held in position around the pipe terminal, without necessity of being held there manually, and while the joint is being completed. When the collar is thus held by one series of lugs on the pipe-terminal, the packing or filling 21 may be readily poured or packed between the collar and the pipe to form a water-tight closure. The pipe-terminal 10 is provided with a series of grooves 22 into which the packing will flow or enter to cause the packing or filling to interlock with the pipe. Furthermore, if for any reason the pipe-terminals should extend too high, these grooves facilitate cutting of the pipe-terminal.

In practice it is customary to subject the soil pipes to a test, to determine whether all joints have been properly made, before the closet is connected, and heretofore, it has been customary to employ a rubber plug in the open end of the pipe-terminal and to close it during the test. These plugs must be driven into the pipe with sufficient force to prevent pressure of the fluid used in the test from removing them. As a substitute for the same, I provide a wall 24 adjacent the upper end of terminal 10, which is cast integral with pipe and is connected thereto by a very thin web or wall of metal as at 25. This wall is permitted to remain in the pipe until after the test has been made, and then by striking the wall a blow with a hammer, the thin web 25 will break away from the pipe. This wall 24 thus serves as a temporary closure for the pipe, and prevents material from being deposited in the pipe until after it has been tested.

The invention thus provides an improved pipe-connection, in which one of the members to be connected, may be readily placed in different positions and will be held in assigned position while the connection is being completed. The invention also provides an improved temporary closure for the pipe-terminal which may be readily removed and is inexpensive.

The invention is not to be understood as restricted to the details set forth since these may be modified by the skilled mechanic within the scope of the appended claim without departing from the spirit and scope of the invention.

Having thus described the invention what I claim as new and desire to secure by Letters Patent is:

In a pipe connection, the combination of a pipe having plural annular series of sustaining lugs on the outside thereof, a collar having at one end an outwardly extending flange and at its other end an inwardly extending flange notched to permit the same to be slipped over the lugs on said pipe so that said flange, when the collar is turned, will rest on and be sustained by one of the series of said lugs, and means for forming a water-tight joint between said collar and pipe.

GEORGE J. DEHN.

Witnesses:
FRED GERLACH,
AMY JEHLE.